United States Patent
Marble et al.

(10) Patent No.: US 9,897,159 B2
(45) Date of Patent: Feb. 20, 2018

(54) SHAPE MEMORY ALLOW THERMALLY COMPENSATING DAMPING SYSTEM

(71) Applicant: GM GLOBAL TECHNOLOGY OPERATIONS LLC, Detroit, MI (US)

(72) Inventors: Robert P. Marble, White Lake, MI (US); Gary Klein, Royal Oak, MI (US); Charles C. Weddle, Fenton, MI (US); Michael E. Mcguire, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/196,625

(22) Filed: Jun. 29, 2016

(65) Prior Publication Data

US 2018/0003260 A1 Jan. 4, 2018

(51) Int. Cl.
*F16F 9/52* (2006.01)
*F16F 9/348* (2006.01)
*F16F 9/19* (2006.01)

(52) U.S. Cl.
CPC .............. *F16F 9/523* (2013.01); *F16F 9/19* (2013.01); *F16F 9/348* (2013.01); *F16F 2222/02* (2013.01); *F16F 2224/0258* (2013.01); *F16F 2228/066* (2013.01)

(58) Field of Classification Search
CPC .... F16F 9/19; F16F 9/348; F16F 9/523; F16F 2224/0258; F16D 2121/32
See application file for complete search history.

(56) References Cited

U.S. PATENT DOCUMENTS

| 6,290,037 B1* | 9/2001 | Williams | F16F 7/1005 188/379 |
| 2005/0133319 A1* | 6/2005 | Wilhelm | F16F 9/5126 188/281 |
| 2008/0251982 A1* | 10/2008 | Sekiya | B60G 17/06 267/140.14 |
| 2012/0141276 A1* | 6/2012 | Fuhrer | B64C 27/51 416/140 |

FOREIGN PATENT DOCUMENTS

| DE | 3822970 | * | 1/1990 |
| JP | 2009228861 | * | 10/2009 |

* cited by examiner

*Primary Examiner* — Vishal R Sahni
(74) *Attorney, Agent, or Firm* — Quinn IP Law

(57) ABSTRACT

A damper assembly includes a housing that defines an interior chamber. A rod is supported by the housing, and is at least partially disposed within the interior chamber. A piston assembly is attached to the rod within the interior chamber. The piston assembly separates the interior chamber into at least a first fluid chamber and a second fluid chamber. The piston assembly includes an annular plate defining at least one orifice, which interconnects the first fluid chamber and the second fluid chamber in fluid communication. The piston assembly includes at least one valve disc that is disposed adjacent a first face of the annular plate. An SMA device is disposed in contact with the valve disc. The SMA device is changeable between a first state and a second state, at a transition temperature, to control a bending stiffness of the valve disc to adjust a damping rate.

10 Claims, 5 Drawing Sheets

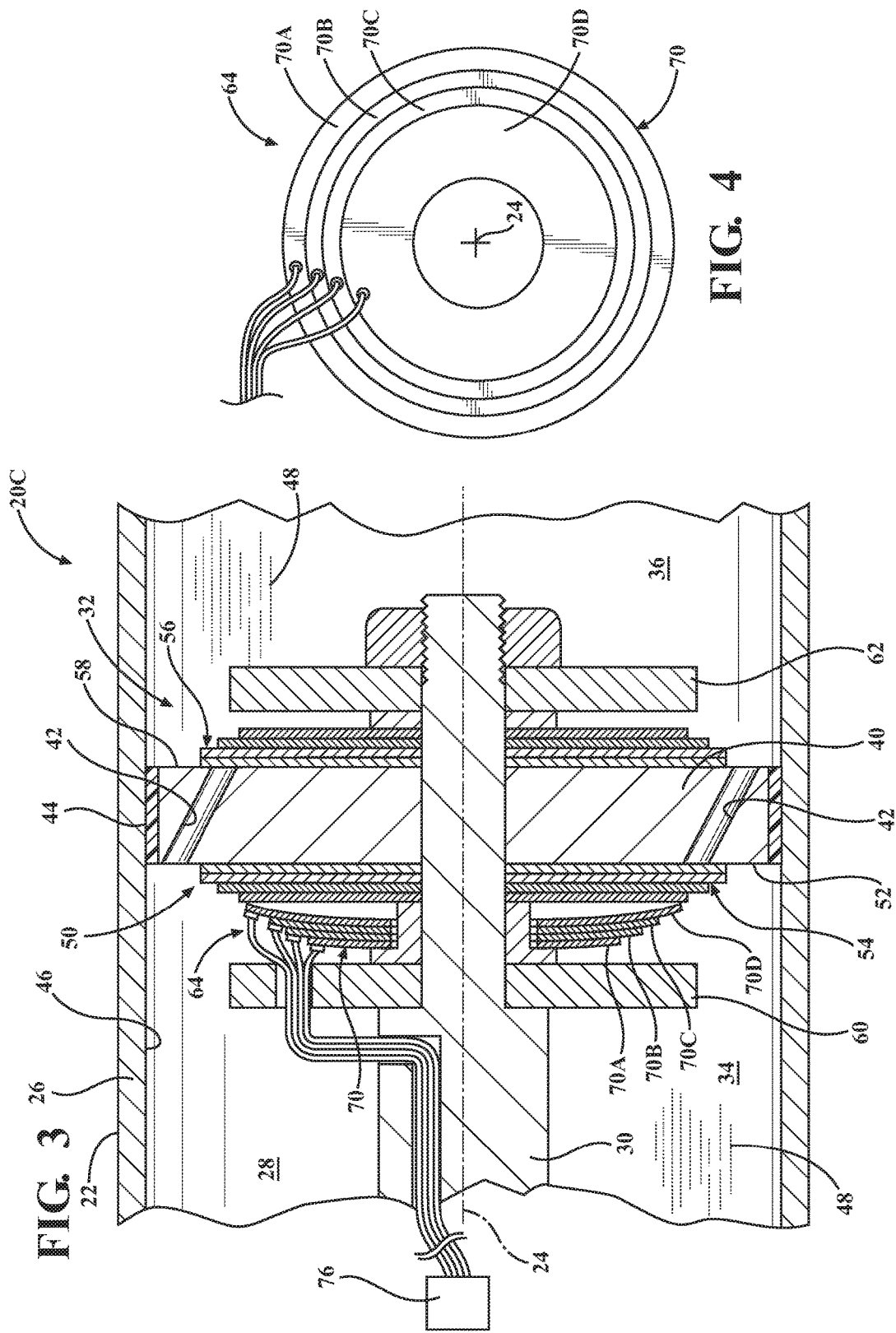

SHAPE MEMORY ALLOW THERMALLY COMPENSATING DAMPING SYSTEM

TECHNICAL FIELD

The disclosure generally relates to a fluid damper assembly.

BACKGROUND

A damper assembly is a mechanical device that dissipates kinetic energy. The damper assembly converts the kinetic energy between two objects into heat, and then dissipates the heat. The damper assembly may include a fluid damper, which forces a viscous fluid through a small orifice in a piston, to control the relative movement between two objects. A fluid metering device may be used to control fluid flow through the orifice. The damping assembly damps movement at a damping rate, which is dependent upon the resistance to the damping fluid flowing through the orifice. The damping rate may be varied or changed by changing the resistance to the damping fluid flowing through the orifice, or as a result of a change of viscosity of the fluid. For example, as the temperature of the fluid increases and the fluid becomes more viscous, the fluid may flow through the orifice more easily and with less resistance, thereby reducing the damping rate.

SUMMARY

A damper assembly is provided. The damper assembly includes a housing that defines an interior chamber, and extends along a longitudinal axis. A rod is supported by the housing, and is at least partially disposed within the interior chamber of the housing. A piston assembly is attached to the rod within the interior chamber of the housing. The piston assembly is positioned to separate the interior chamber into at least a first fluid chamber and a second fluid chamber. The piston assembly is operable to resist relative movement between the rod and the housing at a damping rate. The piston assembly includes an annular plate defining at least one orifice, which interconnects the first fluid chamber and the second fluid chamber in fluid communication. The piston assembly includes at least one valve disc that is disposed adjacent a first face of the annular plate. The valve disc is operable to control fluid flow through the at least one orifice. A Shape Memory Alloy (SMA) device is disposed in contact with the at least one valve disc. The SMA device is changeable between a first state and a second state, at a transition temperature, to control a bending stiffness of the at least one valve disc to adjust the damping rate.

A fluid damper is also provided. The fluid damper includes a housing, which defines an interior chamber, and extends along a longitudinal axis. A rod is supported by the housing, and is at least partially disposed within the interior chamber of the housing. A piston assembly is attached to the rod within the interior chamber of the housing. The piston assembly is positioned to separate the interior chamber into at least a first fluid chamber and a second fluid chamber. The piston assembly is operable to resist relative movement between the rod and the housing at a damping rate. The piston assembly includes an annular plate defining at least one orifice interconnecting the first fluid chamber and the second fluid chamber in fluid communication. A damping fluid is disposed within the interior chamber of the housing. The damping fluid is movable through the at least one orifice between the first fluid chamber and the second fluid chamber. The rod includes an internal passageway in fluid communication with both the first fluid chamber and the second fluid chamber. An SMA device is positioned within the passageway, and is moveable between a first state and a second state to control fluid flow through the passageway to affect the damping rate.

A fluid metering device is also provided. The fluid metering device includes a housing defining a first fluid chamber and a second fluid chamber. A plate is disposed between the first fluid chamber and the second fluid chamber. The plate defines at least one orifice interconnecting the first fluid chamber and the second fluid chamber in fluid communication. At least one valve member covers the orifice. The valve member is operable to control fluid flow through the orifice. The valve member is bendable in response to fluid pressure to regulate fluid flow through the orifice. An SMA device is coupled to the valve member. The SMA device is changeable between a first state and a second state in response to a change in temperature to affect a bending stiffness of the valve member.

Accordingly, the SMA device affects or changes the damping rate when the SMA device changes between its respective first state and second state at its transition temperature. For example, the SMA device may be used to increase the bending stiffness of the valve disc to increase resistance to fluid flow through the orifice, in order to maintain a consistent damping rate as the damping fluid heats. In other embodiments, the SMA device may be actively controlled to provide active handling for different driving conditions, e.g., touring vs. sport driving.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic cross sectional view of a third embodiment of the fluid damper.

FIG. 4 is a schematic plan view of an SMA device of the third embodiment of the fluid damper.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a fluid metering device is generally shown and described. The fluid metering device may include any device capable of metering fluid between two different fluid chambers. One exemplary embodiment of the fluid metering device is a damper assembly 20, often referred to as a shock absorber. The fluid metering device is referred to hereinafter as the damper assembly 20. While the disclosure is described herein using the exemplary embodiment of a damping system, which incorporates the damper assembly 20, it should be appreciated that the fluid metering device may be configured as some other device, such as but not limited to a bushing for connecting two rigid members.

The damping system may be used to damp movement between two components, and/or absorb and dissipate kinetic energy. The damping system may be embodied as a shock absorber system for a vehicle, such as an automobile, truck, motorcycle, snowmobile, airplane, tractor, etc. However, it should be appreciated that the damping system may be used in other, non-vehicular applications, such as industrial machinery, or any other application requiring the damping of movement between two components.

Figure 1:
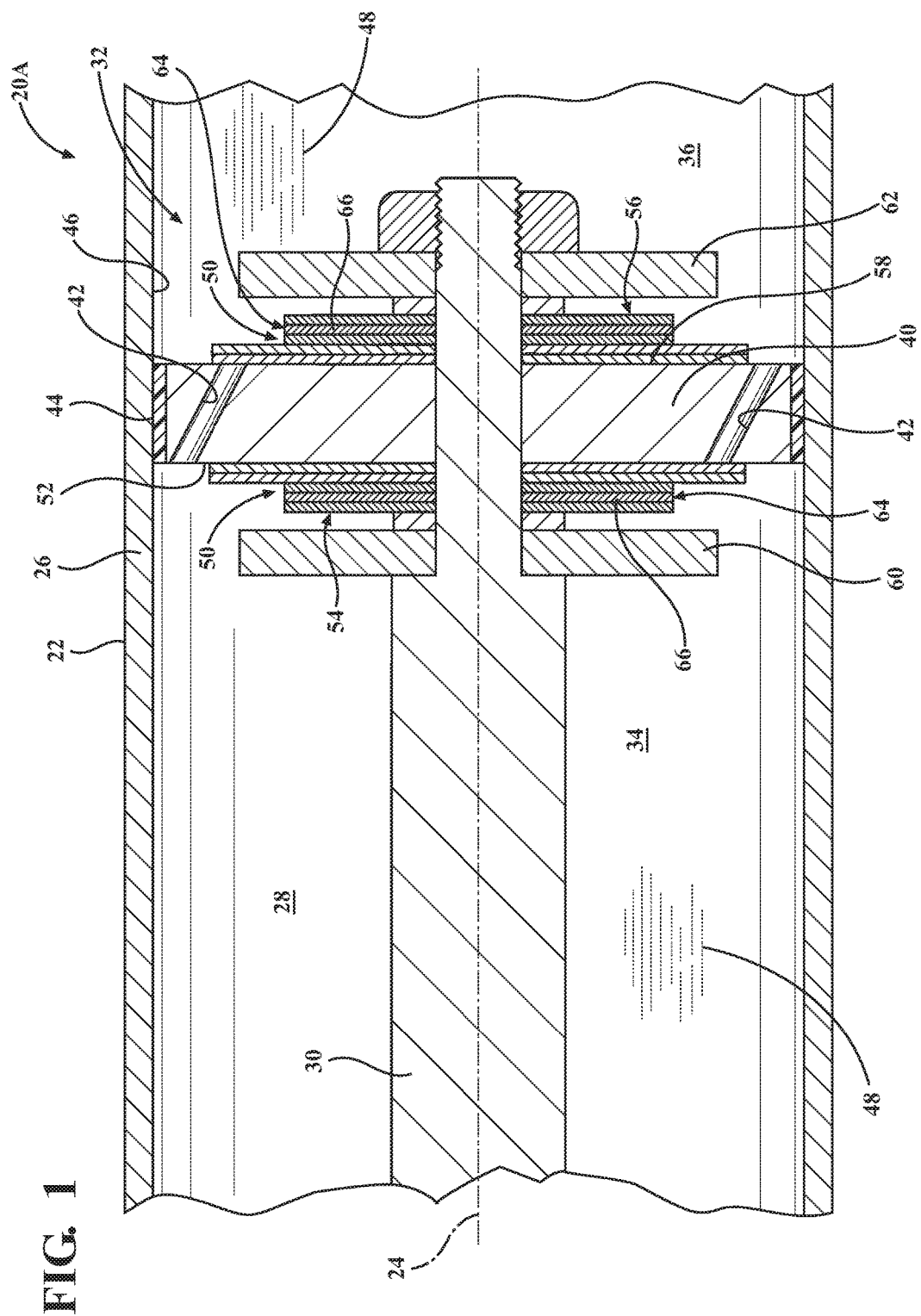
FIG. 1 is a schematic cross sectional view of a first embodiment of a fluid damper.
Figure 2:
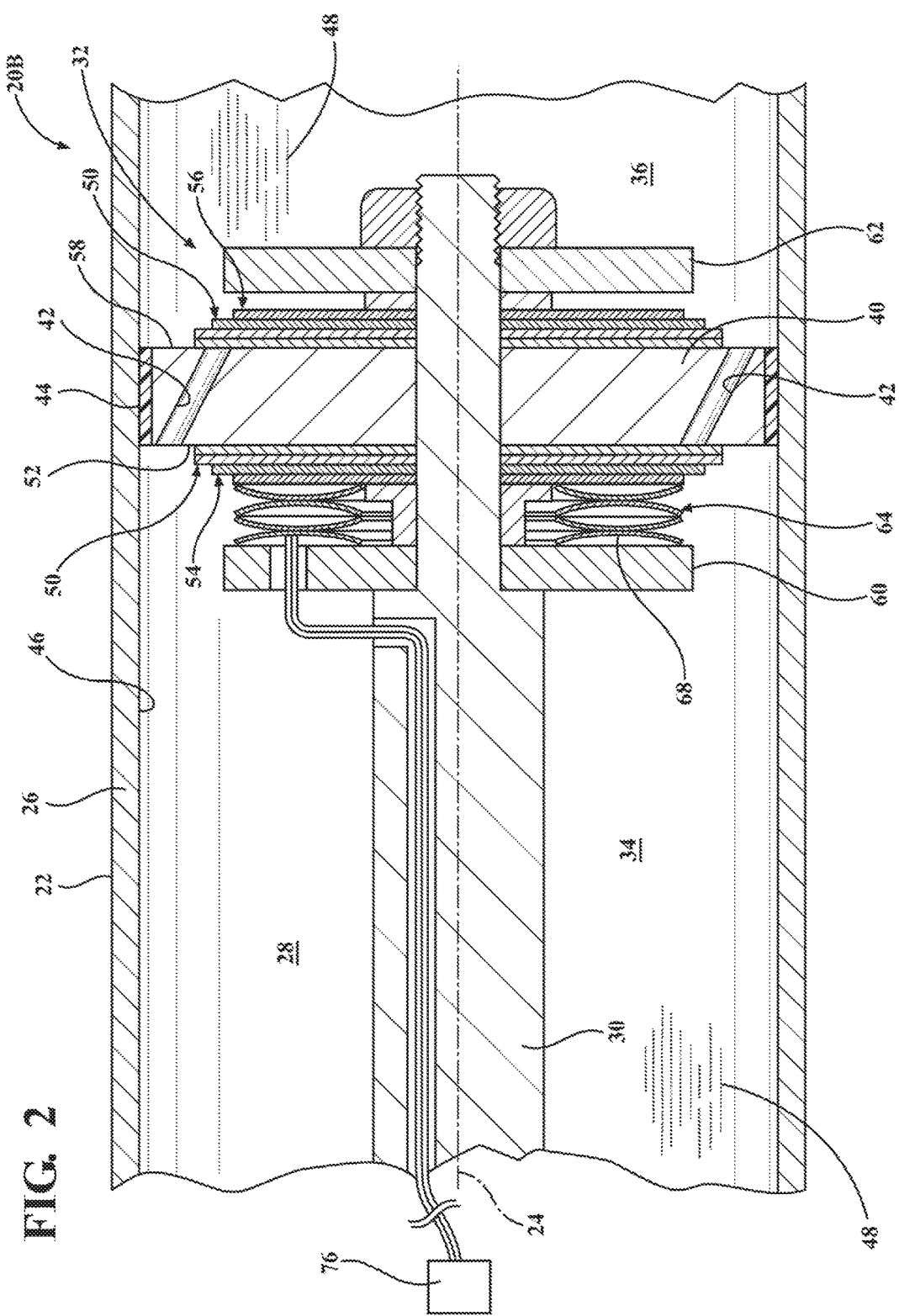
FIG. 2 is a schematic cross sectional view of a second embodiment of the fluid damper.
Figure 5:
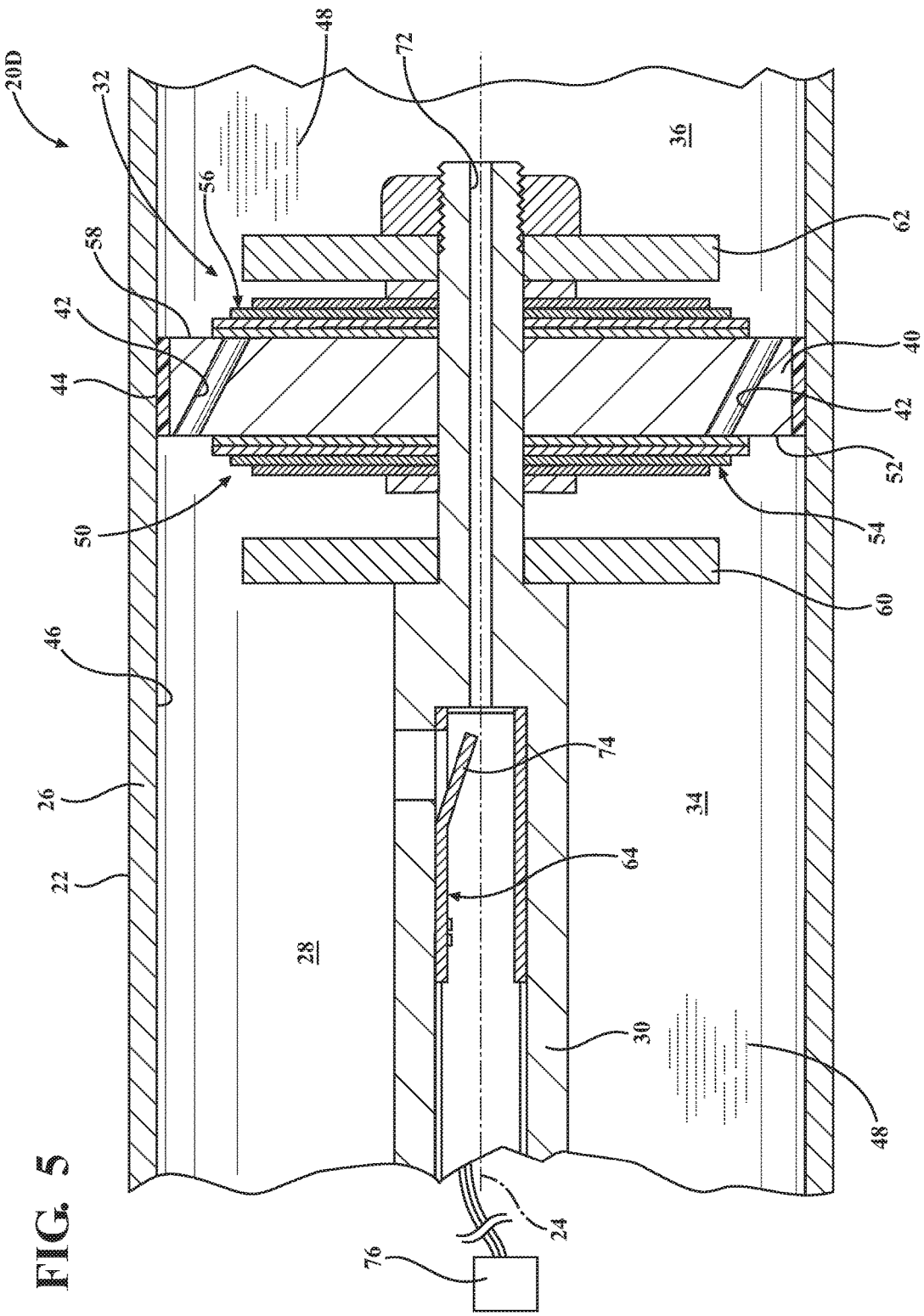
FIG. 5 is a schematic cross sectional view of a fourth embodiment of the fluid damper, showing an SMA device in an open position.
Figure 6:
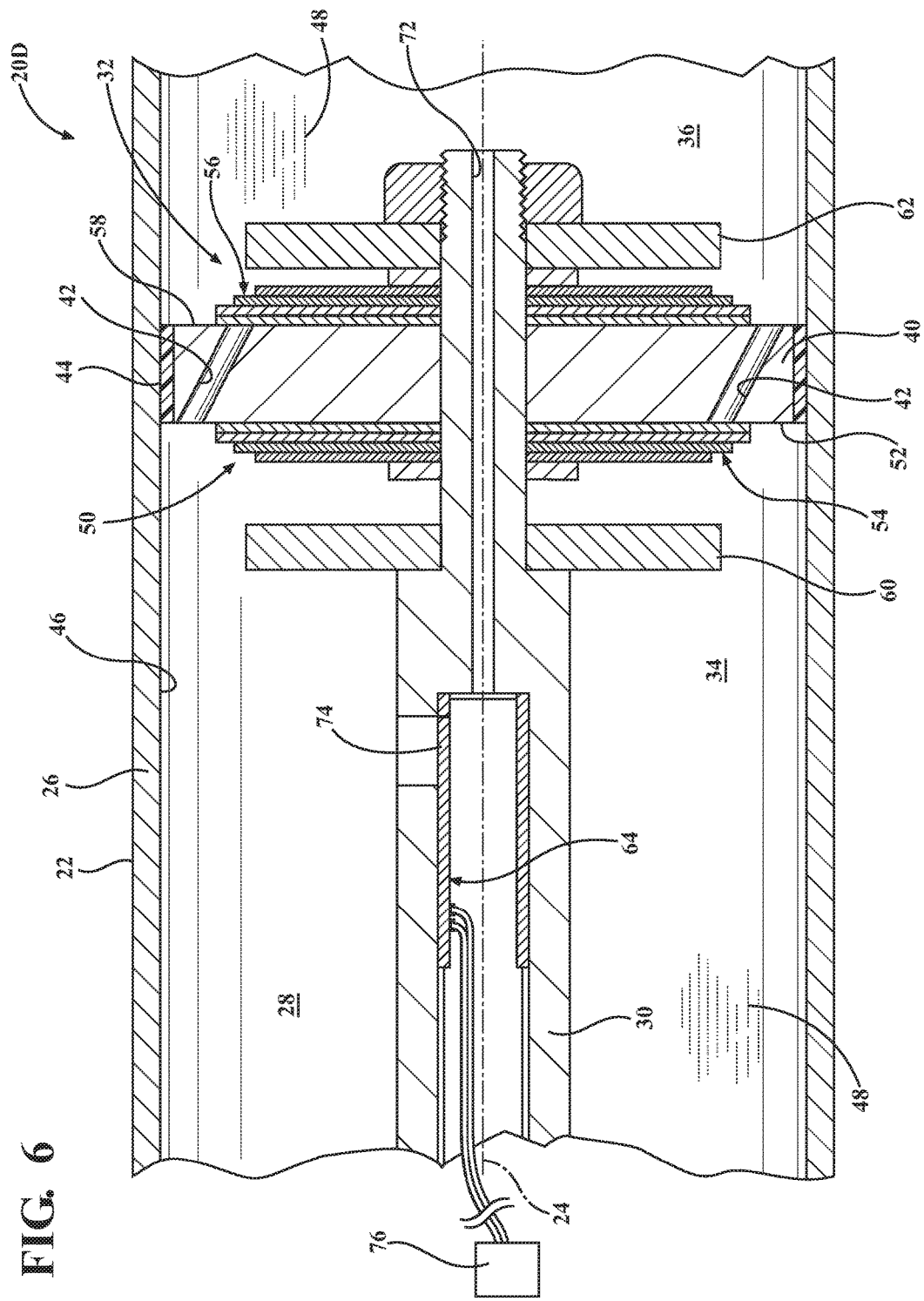
FIG. 6 is a schematic cross sectional view of the fourth embodiment of the fluid damper, showing the SMA device in a closed position.

The damping system includes the damper assembly 20. The different exemplary embodiments of the damper assembly 20, shown in the Figures, share many common features and/or components. These common features and/or components are described below, and are applicable to all of the exemplary embodiments shown and described herein. The specific differences between the different embodiments are described in detail with reference to their specific associated Figures. The damper assembly is generally described herein by the reference numeral 20, and the specific embodiments of the damper assembly are described herein and specifically shown in the Figures by their respective reference numerals 20A, 20B, 20C, 20D. A first embodiment of the damper assembly 20A is generally shown in FIG. 1 at 20A, a second embodiment of the damper assembly 20B is generally shown in FIG. 2 at 20B, a third embodiment of the damper assembly 20C is generally shown in FIGS. 3 and 4 at 20C, and a fourth embodiment of the damper assembly 20D is generally shown in FIGS. 5 and 6 at 20D. It should be appreciated that the general description of the damper assembly 20 provided herein applies to all embodiments 20A, 20B, 20C, 20D of the damper assembly 20.

In the exemplary embodiments shown in the Figures and described herein, the damper assembly 20 includes a housing 22. The housing 22 extends along a longitudinal axis 24, and includes an annular wall 26 that defines a sealed interior chamber 28. A rod 30 is moveably supported by the housing 22 for movement along the longitudinal axis 24 relative to the housing 22. The rod 30 and the housing 22 are generally concentric with each other, with their respective central axes defined by the longitudinal axis 24. The rod 30 is at least partially disposed within the interior chamber 28 of the housing 22. The housing 22 of the damper assembly 20 may include a first attachment end (not shown) that is configured for attachment to a first component (not shown), and the rod 30 may include a second attachment end (not shown) configured for attachment to a second component (not shown), as is known in the art. Relative movement between the first component and the second component causes the rod 30 and the housing 22 to move relative to each other along the longitudinal axis 24.

A piston assembly 32 is attached to the rod 30, within the interior chamber 28 of the housing 22. The piston assembly 32 is positioned to separate the interior chamber 28 of the housing 22 into at least a first fluid chamber 34, and a second fluid chamber 36. The piston assembly 32 includes a valve that defines at least one orifice 42. As shown in the exemplary embodiment, the valve includes an annular plate 40 that defines the least one orifice 42. The plate 40 may alternatively be referred to as a divider, internal damper structure, etc. The annular plate 40 moves with the rod 30, relative to the housing 22. An outer radial surface 44 of the annular plate 40 is disposed in sealing engagement with an interior surface 46 of the annular wall 26 of the housing 22. In some embodiments, the annular plate 40 may include a plurality of orifices 42 disposed radially about the longitudinal axis 24. However, the number and position of the orifices 42 may vary depending upon the specific application for the damping system.

A damping fluid 48 is disposed within the interior chamber 28 of the housing 22. Each of the orifices 42 interconnect the first fluid chamber 34 and the second fluid chamber 36 in fluid communication, to allow the damping fluid 48 to flow between the first fluid chamber 34 and the second fluid chamber 36. The damping fluid 48 is moveable through the orifices 42, between the first fluid chamber 34 and the second fluid chamber 36, in response to relative movement between the rod 30 and the housing 22. The damping fluid 48 may include any viscous fluid, such as but not limited to an oil. While the damping fluid 48 may include a magnetorheological fluid, the use of a magnetorheological fluid as the damping fluid 48 is not required for the proper function of the damper assembly 20, nor is a magnetorheological fluid required to change a damping rate of the damper assembly 20.

The piston assembly 32 is operable to resist relative movement between the rod 30 and the housing 22 at the damping rate, by resisting a flow of the damping fluid 48 through the orifices 42, as is known in the art. The "damping rate" is defined herein as the force generated by the flow of the damping fluid 48 through the orifices 42 used to resist relative movement between the housing 22 and the rod 30.

As shown in the exemplary embodiments, the piston assembly 32 includes at least one valve disc 50 that is disposed adjacent a first face 52 of the annular plate 40. The valve disc 50 controls or regulates fluid flow through the orifices 42. Preferably, the piston assembly 32 includes a plurality of valve discs 50, axially stacked next to each other along the longitudinal axis 24 to form a first disc stack 54 disposed against the first face 52 of the annular plate 40. Each of the valve discs 50 is an annular disc 66 that is supported by the rod 30, and is concentric with the longitudinal axis 24. The piston assembly 32 may further include a second disk stack, comprised of one or more valve discs 50, disposed adjacent a second face 58 of the annular plate 40. As shown, the first disc stack 54 controls fluid flow from the second fluid chamber 36 to the first fluid chamber 34, and the second disc stack 56 controls fluid flow from the first fluid chamber 34 to the second fluid chamber 36.

The valve discs 50 are bendable relative to the rod 30 about a spring point, in response to an applied fluid pressure, to control fluid flow through the orifices 42, between first fluid chamber 34 and the second fluid chamber 36. As such, a fluid pressure of sufficient magnitude causes the valve discs 50 to bend away from the annular plate 40, thereby allowing fluid to flow through the orifices 42.

The piston assembly 32 may further include a first end plate 60 and a second end plate 62. The first end plate 60 is coupled to the rod 30, and is disposed within the first fluid chamber 34. The first disc stack 54 is disposed between the first end plate 60 and the first face 52 of the annular plate 40, along the longitudinal axis 24. The second end plate 62 is coupled to the rod 30, and is disposed within the second fluid chamber 36. The second disc stack 56 is disposed between the second end plate 62 and the second face 58 of the annular plate 40, along the longitudinal axis 24.

The damper assembly 20 includes a Shape Memory Alloy (SMA) device 64, which is disposed within the interior chamber 28 of the housing 22. The SMA device 64 affects the damping rate of the damping system. The SMA device 64 may be configured in many different ways, as exemplified by the different exemplary embodiments of the damper assembly 20 shown and described herein. The SMA device 64 includes or is manufactured from a shape memory alloy.

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. The temperature that the SMA device 64 changes forms and/or states is referred to herein as the transition temperature. In nickel-titanium shape memory alloys, for example, the transition temperature can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory alloy with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

The shape memory alloy, may be activated by any suitable means, preferably a means for subjecting the material to a temperature change above, or below, the transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

The activation signal may include a heat signal, a magnetic signal, an electrical signal, a pneumatic signal, a mechanical signal, and the like, and combinations comprising at least one of the foregoing signals, with the particular activation signal dependent on the materials and/or configuration of the active material. For example, an electrical signal or a heat signal may be applied for changing the property of the SMA device 64.

The SMA device 64 is changeable between a first state and a second state, at the transition temperature. The first state and the second state may include and be defined by different physical properties of the SMA device 64, e.g., a bending stiffness or a spring rate. As such, the SMA device 64 would change physical properties when switching between the first state and the second state at the transition temperature. In other embodiments, the first state and the second state may include and be defined by different shapes. As such, the SMA device 64 would change shape when switching between the first state and the second state at the transition temperature. In either case, the change between the first state and the second state affects the damping rate of the damping assembly.

Referring to FIG. 1, the first embodiment of the damper assembly is generally shown at 20A. The SMA device 64 shown in the first embodiment of the damper assembly 20A is an annular disc 66 formed from a shape memory alloy material, which is axially stacked adjacent the valve discs 50, along the longitudinal axis 24. The annular disc 66 is disposed in contact with at least one of the valve discs 50, and is coupled to and supported by the rod 30. More specifically, the annular disc 66 is axially stacked along the longitudinal axis 24 between two of the plurality of valve discs 50. The annular disc 66 includes a first annular disc 66 stacked between two of the valve discs 50 of the first disc stack 54, and a second annular disc 66 stacked between two of the valve discs 50 of the second disc stack 56. The first disc stack 54 and the first annular disc 66 are disposed between the first end plate 60 and the first face 52 of the annular plate 40, whereas the second disc stack 56 and the second annular disc 66 are disposed between the second end plate 62 and the second face 58 of the annular plate 40.

The SMA device 64 changes between the first state and the second state to control a bending stiffness of the valve discs 50 to adjust the damping rate. It should be appreciated that the first annular disc 66 changes between the first state and the second state to affect the damping rate controlled by the first disc stack 54, whereas the second annular disc 66 changes between the first state and the second state to affect the damping rate controlled by the second disc stack 56.

The first state and the second state of the annular disc 66 may be defined in the first embodiment of the damper assembly 20A as a bending stiffness. Accordingly, the annular disc 66 changes its bending stiffness when it changes between the first state and the second state. For example, if the high temperature state has a higher bending stiffness, then when the annular disc 66 changes from the low temperature state, e.g., the first state, to the high temperature state, e.g., the second state, the bending stiffness of the annular disc 66 increases. By increasing the bending stiffness of the annular disc 66, which is disposed between two of the valve discs 50 of the valve stacks, the bending stiffness of the respective valve stacks is increased, which affects the damping rate of the damper assembly 20A.

Referring to FIG. 2, the second embodiment of the damper assembly is generally shown at 20B. The SMA device 64 shown in the second embodiment of the damper assembly 20B includes a coiled wave spring 68 formed from a shape memory alloy material. As understood by those in the art, the coiled wave spring 68 is a flat wire that is formed into a coil, and to include waves. The coiled wave spring 68 is axially disposed between the first end plate 60 and the first disc stack 54 along the longitudinal axis 24. The coiled wave spring 68 biases the first disc stack 54 against the annular plate 40.

The coiled wave spring 68 changes between the first state and the second state to control a spring rate or spring force that is applied to the valve discs 50 to adjust the damping rate. It should be appreciated that the coiled wave spring 68 changes between the first state and the second state to affect the damping rate controlled by the first disc stack 54. While not shown, it should be appreciated that the damper assembly 20B may include a second coiled wave spring axially disposed between the second end plate 62 and the second disc stack 56 along the longitudinal axis 24 to affect the damping rate controlled by the second disc stack 56.

The first state and the second state of the coiled wave spring 68 may be defined in the second embodiment of the damper assembly 20B as the spring rate of the coiled wave spring 68. Accordingly, the coiled wave spring 68 changes its spring rate when it changes between the first state and the second state. For example, if the high temperature state has a higher spring rate, then when the coiled wave spring 68 changes from the low temperature state, e.g., the first state, to the high temperature state, e.g., the second state, the spring rate of the coiled wave spring 68 increases. By increasing the spring rate of the coiled wave spring 68, which is biased against the valve discs 50 of the first disc stack 54, the bending stiffness of the first disc stack 54 is increased, which affects the damping rate of the damper assembly 20B.

Referring to FIGS. 3 and 4, the third embodiment of the damper assembly is generally shown at 20C. The SMA device 64 shown in the third embodiment of the damper assembly 20C includes at least one conical disc spring 70 formed from a shape memory alloy material. As shown in FIGS. 3 and 4, the conical disc spring 70 is shown including a first disc 70A, a second disc 70B, a third disc 70C, and a fourth disc 70D. While the conical disc spring 70 is shown including the first, second, third, and fourth discs 70A, 70B, 70C, 70D, it should be appreciated that the conical disc spring 70 may include only a single disc, two discs, three discs, four discs, or some other number of discs. Accordingly, the conical disc spring 70 is not limited to the exemplary embodiment showing four discs.

As understood by those in the art, the conical disc spring 70, often referred to as a Bellville spring, is a circular washer or disc having a frusto-conical shape. The conical disc spring 70 is axially disposed between the first end plate 60 and the first disc stack 54 along the longitudinal axis 24. The conical disc spring 70 biases the first disc stack 54 against the annular plate 40.

The conical disc spring 70 changes between the first state and the second state to control a spring rate or spring force that is applied to the valve discs 50 to adjust the damping rate. It should be appreciated that the conical disc spring 70 changes between the first state and the second state to affect the damping rate controlled by the first disc stack 54. While not shown, it should be appreciated that the damper assembly 20C may include a second conical disc spring axially disposed between the second end plate 62 and the second disc stack 56 along the longitudinal axis 24 to affect the damping rate controlled by the second disc stack 56.

The first state and the second state of the conical disc spring 70 may be defined in the third embodiment of the damper assembly 20C as the spring rate of the conical disc spring 70. Accordingly, the conical disc spring 70 changes its spring rate when it changes between the first state and the second state. For example, if the high temperature state has a higher spring rate, then when the conical disc spring 70 changes from the low temperature state, e.g., the first state, to the high temperature state, e.g., the second state, the spring rate of the conical disc spring 70 increases. By increasing the spring rate of the conical disc spring 70, which is biased against the valve discs 50 of the first disc stack 54, the bending stiffness of the respective valve discs 50 of the first disc stack 54 is increased, which affects the damping rate of the damper assembly 20C.

As noted above, the third embodiment of the damper assembly 20C includes at least one conical disc spring 70 formed from a shape memory alloy material. Preferably, the conical disc spring 70 includes a plurality of conical discs 70A, 70B, 70C, 70D axially stacked adjacent each other along the longitudinal axis 24, with each of the conical disc springs 70A, 70B, 70C, 70D formed from a shape memory alloy material. The transition temperature of at least one of the conical discs 70A, 70B, 70C, 70D of the SMA device 64 may be different from the transition temperature of at least another of the plurality of conical discs 70A, 70B, 70C, 70D of the SMA device 64. For example, the transition temperature of all of the conical disc 70A, 70B, 70C, 70D of the SMA device 64 may be incrementally different, so that each of the conical discs 70A, 70B, 70C, 70D changes between their respective first state and second state at different transition temperatures. Alternatively, all of the conical discs 70A, 70B, 70C, 70D may have the same transition temperature, so that all of the conical discs 70A, 70B, 70C, 70D change between their respective first state and second state at the same transition temperature.

Referring to FIGS. 5 and 6, a fourth embodiment of the damper assembly is generally shown at 20D. The damper assembly 20D includes an SMA device 64 that is used to control fluid flow into and out of at least one of the first fluid chamber 34 and the second fluid chamber 36. As shown in the exemplary embodiment of the damper assembly 20D, the rod 30 of the damper assembly 20D includes an internal passageway 72, which is in fluid communication with both the first fluid chamber 34 and the second fluid chamber 36. The internal passageway 72 is in addition to the orifices 42 in the annular plate 40. Accordingly, the valve discs 50 do not affect fluid flow through the internal passageway 72 of the rod 30.

The SMA device 64 is positioned within the internal passageway 72 of the rod 30, and is positioned to control fluid flow through the passageway 72, between the first fluid chamber 34 and the second fluid chamber 36. The SMA device 64 of the fourth embodiment of the damping assembly 20D is a valve member 74 that is moveable between a first state and a second state to control fluid flow through the passageway 72. The first state and the second state of the SMA device 64 may be defined in the fourth embodiment of the damper assembly 20D as a shape of the valve member 74. As shown in FIG. 5, the valve member 74 includes a first shape that opens fluid communication through the internal passageway 72 of the rod 30, to allow fluid communication between the first fluid chamber 34 and the second fluid chamber 36. As shown in FIG. 6, the valve member 74 includes a second shape that closes fluid communication through the internal passageway 72 of the rod 30. By opening and/or closing fluid communication through the internal passageway 72, the damping fluid 48 may move between the first fluid chamber 34 and the second fluid chamber 36, thereby affecting the damping rate of the damper assembly 20D.

While the fourth embodiment of the damper assembly 20D shows the SMA device 64 positioned within the passageway 72 to control fluid flow through the passageway 72, between the first fluid chamber 34 and the second fluid chamber 36, it should be appreciated that the valve member 74 of the SMA device 64 may be positioned elsewhere, such as on the housing 22, to control fluid flow between an external tank (not shown) and one of the first fluid chamber 34 or the second fluid chamber 36.

All of the different embodiments of the damper assembly 20 shown in the various Figures may control the SMA device 64 actively or passively. Passive control of the SMA device 64 may be defined as transformation of the SMA device 64 without any external control signals being applied, whereas active control of the SMA device 64 may be defined as transformation of the SMA device 64 using an applied control signal. For example, passive control may include transformation of the SMA device 64 that occurs in response to environmental heating, without any applied control signals. For example, the SMA device 64 may be passively controlled by the temperature of the damping fluid 48. As the temperature of the damping fluid 48 increases during normal operation, the damping fluid 48 will heat the SMA device 64. Once the damping fluid 48 has heated the SMA device 64 to the transition temperature, the SMA device 64 changes between its respective first state and second state. As the damping fluid 48 cools, the SMA device 64 will also cool. Once the SMA device 64 cools to below the transition temperature, the SMA device 64 will change between its respective first state and second state.

The SMA device 64 may be actively controlled by a controller 76 in communication with the SMA device 64, and operable to send an electric signal to the SMA device 64 to control the temperature of the SMA device 64. The controller 76 may include a control module, such as but not limited to an engine control module, a brake control module, a ride control module, etc. The controller 76 may alternatively be referred to by synonymous names, such as a control unit, vehicle controller 76, computer, etc. The controller 76 is operable to control the operation of the SMA device 64. The controller 76 may include a computer and/or processor, and include all software, hardware, memory, algorithms, connections, sensors, etc., necessary to manage and control the operation of the SMA device 64. As such, a method of controlling the SMA device 64 may be embodied as a program or algorithm that is operable on the controller 76. It should be appreciated that the controller 76 may include any device capable of analyzing data from various sensors, comparing data, making the necessary decisions required to control the operation of the SMA device 64, and executing the required tasks necessary to control the operation of the SMA device 64.

The controller 76 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

As noted above, the controller 76 is operable to generate a control signal, e.g., an electric signal, which is communicated to the SMA device 64 for controlling the SMA device 64 between at least its first state and second state. The electric signal, for example, may heat the SMA device 64 to the transition temperature to cause the SMA device 64 to change between the first state and the second state. The electric signal may be interrupted or stopped, thereby allowing the SMA device 64 to cool, and thereby cause the SMA device 64 to change between its first state and second state.

The first embodiment of the damper assembly 20A, shown in FIG. 1, provides an example of a passively controlled SMA device 64. However, it should be appreciated that the first embodiment of the damper assembly 20A may alternatively be actively controlled. Similarly, while the second, third, and fourth embodiments of the damper assembly 20B, 20C, 20D are shown as being actively controlled, it should be appreciated that the second, third, and fourth embodiments of the damper assembly 20B, 20C, 20D may be passively controlled as well.

The controller 76 may control the damper assembly 20 to change the damping rate between a discrete number of pre-defined damping rates to provide different driving modes, such as but not limited to a "sport" mode, a "touring" mode, a "snow" mode, etc. Alternatively, the controller 76 may continuously and actively control the damping rate of the damper assembly 20 between an infinite number of damping rates to provide active, real time damping for the current operating condition of the vehicle.

For example, referring to FIGS. 3 and 4, the SMA device 64 is shown including 4 different conical disc springs 70. Each of the conical disc springs 70 may be actively controlled independent of the other conical disc springs 70 of the SMA device 64. Accordingly, the controller 76 may signal any combination of the conical disc springs 70 to change between their respective first state and second state, as desired to provide a specific damping rate for any given driving condition.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A damper assembly comprising:
a housing defining an interior chamber, and extending along a longitudinal axis;
a rod supported by the housing and at least partially disposed within the interior chamber of the housing;
a piston assembly attached to the rod within the interior chamber of the housing, and positioned to separate the interior chamber into at least a first fluid chamber and a second fluid chamber, and operable to resist relative movement between the rod and the housing at a damping rate;
wherein the piston assembly includes an annular plate defining at least one orifice interconnecting the first fluid chamber and the second fluid chamber in fluid communication;
wherein the piston assembly includes at least one valve disc disposed adjacent a first face of the annular plate for controlling fluid flow through the at least one orifice;
a shape memory alloy (SMA) device in contact with the at least one valve disc and changeable between a first state and a second state, at a transition temperature, to control a bending stiffness of the at least one valve disc to adjust the damping rate;
wherein the SMA device includes a plurality of conical disc springs, with each of the plurality of conical disc springs formed from a shape memory alloy material and axially stacked adjacent each other along the longitudinal axis; and
wherein each of the plurality of conical disc springs is actively controlled independent of the other of the plurality of conical disc springs of the SMA device.

2. The damper assembly set forth in claim 1, wherein the SMA device is disposed within the interior chamber of the housing, and is coupled to the rod.

3. The damper assembly set forth in claim 1, wherein the at least one valve disc is bendable relative to the rod about a spring point in response to a fluid pressure to control fluid flow through the at least one orifice, between first fluid chamber and the second fluid chamber.

4. The damper assembly set forth in claim 1, further comprising a first end plate coupled to the rod, with the at least one valve disc and the SMA device disposed between the first end plate and the first face of the annular plate.

5. The damper assembly set forth in claim 1, wherein the transition temperature of at least one of the plurality of conical disc springs of the SMA device is different from the transition temperature of at least another of the plurality of conical disc springs of the SMA device.

6. The damper assembly set forth in claim 1, further comprising a damping fluid disposed within the interior chamber of the housing, and movable through the at least one orifice between the first fluid chamber and the second fluid chamber.

7. The damper assembly set forth in claim 6, wherein the SMA device is passively controlled by a temperature of the damping fluid.

8. The damper assembly set forth in claim 1, further comprising a controller in communication with the SMA device, and operable to send an electric signal to the SMA device to control the temperature of the SMA device.

9. The damper assembly set forth in claim 8, wherein the SMA device is actively controlled by the controller.

10. A damper assembly comprising:
a housing defining a first fluid chamber and a second fluid chamber;
a plate disposed between the first fluid chamber and the second fluid chamber and defining at least one orifice interconnecting the first fluid chamber and the second fluid chamber in fluid commination;
at least one valve member covering the at least one orifice for controlling fluid flow through the at least one orifice, wherein the at least one valve member is bendable in response to fluid pressure to regulate fluid flow through the at least one orifice;
an SMA device coupled to the at least one valve member and changeable between a first state and a second state in response to change in temperature to affect a bending stiffness of the at least one valve member;
a controller in communication with the SMA device, and operable to send an electric signal to the SMA device to control the temperature of the SMA device;
wherein the SMA device includes a plurality of conical disc springs, with each of the plurality of disc springs formed from a shape memory alloy material and axially stacked adjacent each other along the longitudinal axis; and
wherein each of the plurality of conical disc springs is actively controlled by the controller independent of the other of the plurality of conical disc springs of the SMA device.

* * * * *